Sept. 10, 1929.　　J. HERR ET AL　　1,727,431
SEED HARVESTER
Filed Jan. 3, 1927　　2 Sheets-Sheet 1
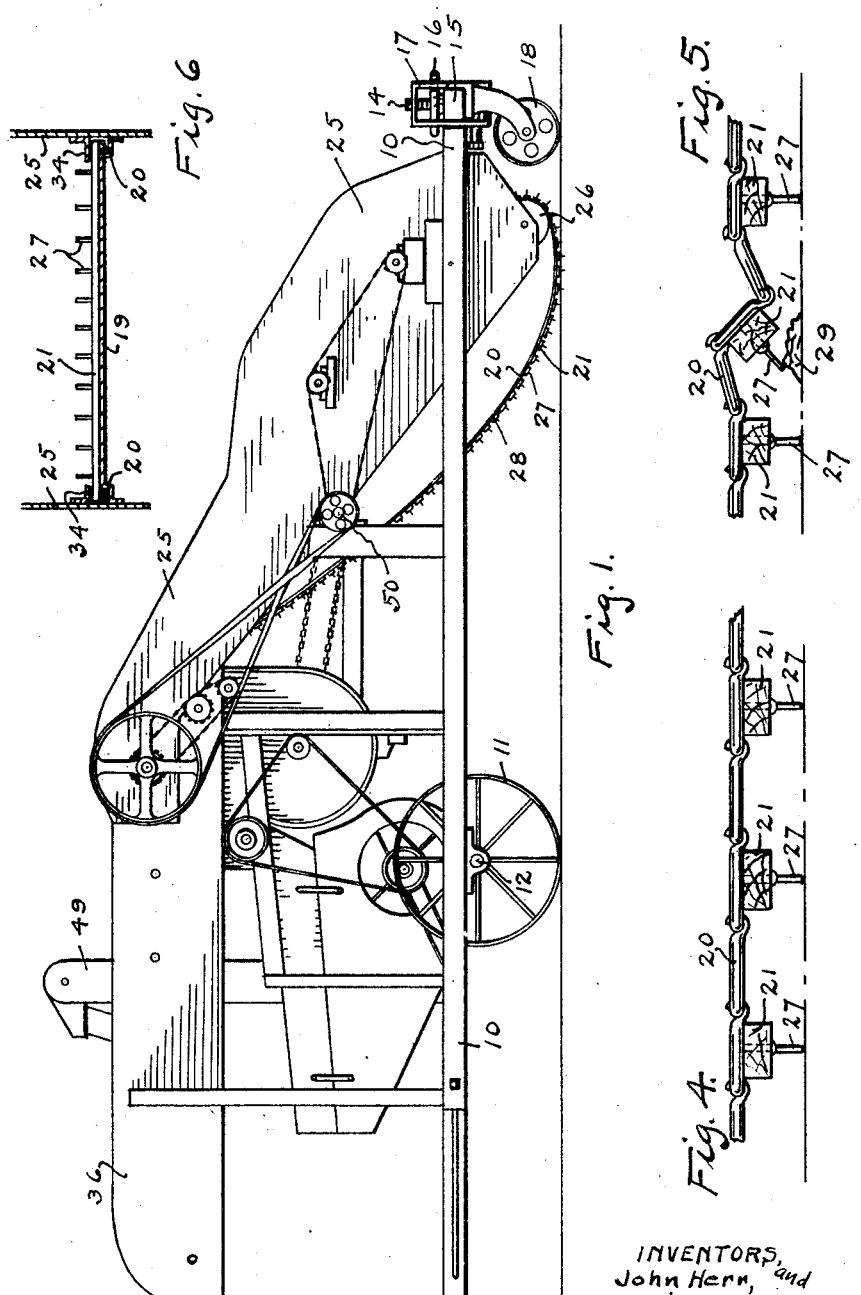
INVENTORS,
John Herr, and
Benjamin Garrett Herr,
By Minturn & Minturn,
Attorneys.

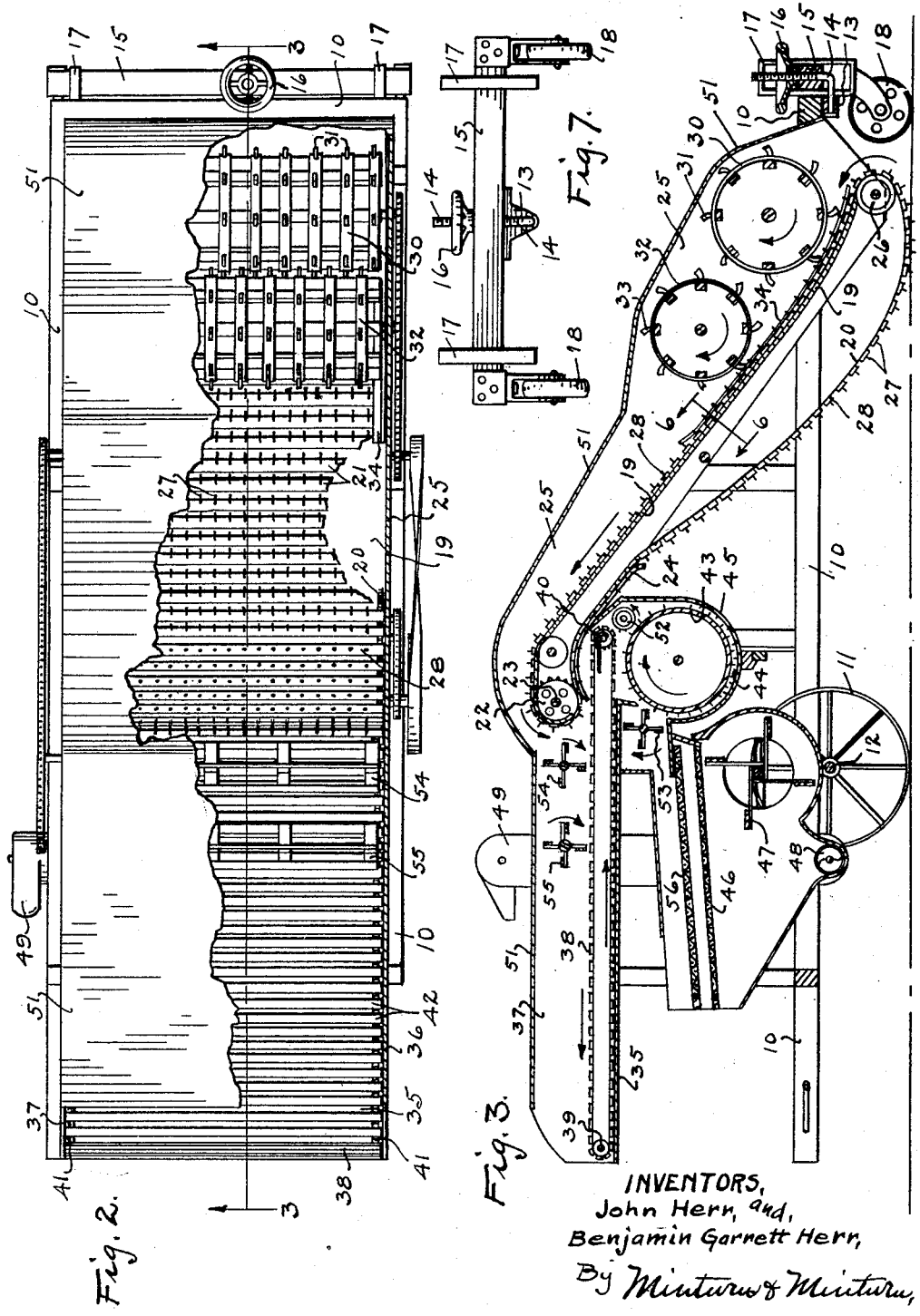

Patented Sept. 10, 1929.

1,727,431

UNITED STATES PATENT OFFICE.

JOHN HERR AND BENJAMIN GARRETT HERR, OF NEAR LEBANON, INDIANA.

SEED HARVESTER.

Application filed January 3, 1927. Serial No. 158,585.

This invention relates to means for harvesting seed crops directly from the fields, and the form described herein is that adapted for use in harvesting clover seed, though the invention is equally adapted to harvest other seeds, and with this general use in mind, will be here designated for convenience as a clover seed harvester.

The invention may be described generally as comprising a complete unit, horse-drawn or tractor-operated as desired, to be drawn around the field. The clover is first mowed when the seed is at the proper stage of ripening. The mowing operation will leave the clover lying on the ground in windrows a swath wide in a continuous line around the field. Should the clover be light upon the ground, two swaths may be raked together to form a heavier windrow. The clover is allowed to lie in the windrow until properly cured.

The harvesting unit is directed along each windrow to pick up the entire clover, pass it into the unit, separate the seed from the heads and straw, discharge the straw to the rear of the unit, clean the seed and deposit it in any suitable receptacle, such as a grain bag.

Heretofore, the method of obtaining clover seed was to first mow the standing clover and bunch it for curing. When cured sufficiently to permit the seed to be separated from the clover heads and to insure keeping of the seed after separation, any handling of the clover resulted in considerable loss of the seed.

A neighborhood separator, huller, or threshing machine, as it is termed in various localities was employed to go from farm to farm with the usual result that owing to unfavorable weather conditions considerable time intervened from the first cutting down of the clover until the huller arrived. In the meantime the ripened clover was left in contact with the ground subject to all the damage of the elements. Then when the huller did arrive, the clover could only be handled without serious seed loss when the clover was slightly damp, and had to be loaded carefully onto wagons by hand, hauled in to the huller, and pitched off by hand into the huller. The straw was discharged onto one pile to form a stack that had to be laboriously handled by hand work to be returned and spread on the fields to obtain its mechanical and fertilizing value to the soil.

The value of our invention is at once apparent by the comparison. Our clover seed harvester is brought into action at once when the clover is at just the proper stage of ripening and continuously passed over the field eliminating all delay and all hand work. The straw is returned to the ground immediately, the clover seed obtained in its prime state, and no additional labor, such as pitchers and wagons, is required.

The invention is described in reference to the accompanying drawings in which—

Fig. 1, is a side elevation of the clover seed harvester;

Fig. 2, a fragmentary top plan view of the harvester;

Fig. 3, a longitudinal vertical section through the harvester on the line 3—3 in Fig. 2;

Fig. 4, an end elevation of a detail of the conveyer as it contacts the ground;

Fig. 5, a detail similar to that in Fig. 4, illustrating the action of the members of the conveyer in passing over an obstruction;

Fig. 6, a transverse section through the elevating platform of the harvester on the line 6—6 in Fig. 3; and Fig. 7, a front elevation of the front carriage of the harvester.

Like characters of reference indicate like parts throughout the several views.

In order to insure the free working of the harvester as it passes over the uneven ground of the usual field, a three point suspension is effected by providing a rigid frame 10 supported back of its center by the two wheels 11 on a common axle 12. A bracket 13 is secured centrally to the under side of the front cross member of the frame 10 and pivotally received and retained therein is a bolt 14 extending forwardly from the bracket 13, thence normally upwards to slidingly pass through a cross-beam 15. The upper end of the bolt 14 is screw-threaded to receive thereon the hand-wheel 16 which contacts the upper side of the cross-beam 15 thereby forming the single front point suspension of the frame 10.

A closed rectangular guide-yoke 17 is secured to the front face of the front end of the frame 10 near each side, and the cross-beam 15 extends outwardly through each so that the cross-beam 15 may rotate or rock in a vertical plane about the pivot formed by the bolt 14 in the frame bracket 13, and be held in proper alinement by the yokes 17.

A caster wheel 18 is pivotally secured to each of the outer ends of the cross-beam 15. The frame 10 may be rocked about the rear axle 12 by running the hand-wheel 16 up or down the bolt 14.

A platform 19 extends between the two side walls 25, upwardly and backwardly from near the front end of the frame 10. An endless elevating conveyer generally designated by the numeral 28 formed of the two side chains 20 and the transverse connecting slats 21 spaced apart one from the other, slides on the platform 19 and passes up over and around the top end of the platform with its chains in mesh with the driving sprocket wheels 22 on each end of the driving shaft 23, thence back up and over the guides 24 mounted one on each side wall 25 under the platform 19, from which guides the conveyer drops down to swing free with an appreciable slack, to be then carried forwardly and up over and around the lower front cylinder 26 and then back up over the platform 19 as before.

Each cross slat 21 carries a plurality of projecting fingers 27 regularly spaced apart to form parallel rows in the direction of travel of the slats 21. As indicated in Figs. 1 and 3, the conveyer 28 has sufficient slack in the part hanging from below the platform 19 to permit the fingers 27 to contact the ground when the frame 10 is sufficiently lowered by the hand-wheel 16. The cylinder 26 is carried at a distance above the ground so that the conveyer 28 travels from the ground behind the cylinder 26 in a generally ascending direction to go around the cylinder 26.

Should exceptionally rough ground be encountered with obstructions being present such as a rock 29, Fig. 5, the conveyer 28 will not be damaged but will readily pass over the obstruction since the slats 21, being secured to the links of the chains 20 which hang slack, may turn to let the fingers 27 swing backwardly until they slide over the obstruction, when the forward pull on the chains will turn the fingers back to their normal presentation from the chains.

A cylinder 30 is carried transversely between the side walls 25 to revolve just above the conveyer 28 near the lower end of the platform 19. Teeth 31 project from the cylinder 30 to pass between the fingers 27, to form in effect, the usual cylinder and concave construction of usual grain separators as is well known to those versed in the art. However, a very pertinent distinction is to be noted in that in our invention, the conveyer 28, forming the concave is moving continuously under the cylinder 30 when it revolves as opposed to the heretofore always stationary positioned concave.

A second cylinder 32 is similarly positioned just above the cylinder 30, and carries similar teeth 33 to pass between the fingers 27 as they travel under the cylinder. Both cylinders 30 and 32 revolve in a clockwise direction and at a high rate of speed as compared to the movement of the conveyer 28.

Guides 34 are secured to the sidewalls 25, one on each side to contact the upper sides of the ends of the slats 21, in the immediate vicinity of the cylinders 30 and 32, as a means of maintaining the slats 21 in sliding contact with the platform 19 and to prevent the slats 21 from rocking to throw the fingers 27 from their normal positions.

A second platform 35 is carried from a line below the upper end of the platform 19 to a substantial distance to the rear, between the side walls 36 and 37. An endless conveyer generally designated by the numeral 38 is carried between the side walls 36 and 37 on the rear roller 39 and the front driving sprockets 40 to have the upper portion of the conveyer moving backwardly away from the platform 19 and returning back under and slidingly in contact over the platform 35.

The conveyer 38 is similar to the first described conveyer 28 in that it is comprised of the endless side chains 41 carrying transverse slats 42 spaced apart with openings therebetween.

The forward end of the platform 35 terminates behind the forward end of the conveyer 38 to form an opening, over which the conveyer 38 travels, directly above a revolvable separating cylinder 43 formed in the usual manner well known in the art for separating seed from its hulls or the heads carrying the seeds.

The cylinder 43 is carried above the usual concave 44 in the housing 45, from which the discharge is to a fan mill comprising the usual screens 56 and 46, the fan 47, the seed conveyer 48 and the elevator 49.

The device here shown is a tractor operated harvester adapted to be hitched to the side of a tractor and to receive power from the tractor to the main harvester drive shaft 50, from which belts and chains lead to the various other shafts to be operated.

In operation, the harvester is directed down the windrow. The conveyer 28 moves slightly faster than the travel of the harvester. The lower end of the conveyer 28 moving from the ground upwardly, picks up the clover by means of the fingers 27 and directs the windrow upwardly and toward the cylinder 30 which tends to carry the clover upwardly between the cylinder and conveyer, but by reason of the cylinder teeth 31 and the fingers 27, the clover is well beaten and torn apart in its travel thereby, and the same process is repeated by the cylinder 32. A cover 51 is provided to prevent loss of the clover material.

Much of the seed is separated from the clover in passing the cylinders 30 and 32, and this seed together with all of the chaff and straw is dragged along over the platform 19 by the cross slats 21 to the top end, from which it drops toward the second conveyer 38.

Most of the straw will remain on the top side of the conveyor 38 and be carried on back to be discharged over the rear end. The finer chaff and seed will however drop between the slats 42 to the platform 35 where such material will be dragged forwardly along the platform and be dumped onto the cylinder 43, which with the aid of the deflecting cylinder 52 carries the material down, around, under the cylinder 43 to further separate the seed from any adhering hulls, and discharges the material to the rear to be directed by the revolving deflector 53 onto the screen 56, through which the seed falls to the screen 46, and then to the conveyer 48, and the chaff is blown away by the fan 47. The seed is then carried up the elevator 49 and deposited in sacks as desired.

Agitating cylinders 54 and 55 are provided over the conveyer 38 to aid in moving the material away from the dumping end of the conveyer 28 and to agitate the material whereby all of the seed may be separated from the coarser straw so that it may drop between the slats and not be carried away and lost. Other means of agitating the material on the conveyer 38 may be employed to effect the same result, such, for example, as shaking or jolting the upper portion of the conveyer 38.

We claim:

1. In a seed harvester adapted to handle mowed seed-bearing stalks, an inclined platform directed downwardly and forwardly at the front of the harvester, and an endless conveyer adapted to be moved upwardly over said platform, said conveyer having a portion hanging free under the platform to curve downwardly toward the ground and resting on the ground for an appreciable distance and thence upwardly and back over the platform to pick up the seed-bearing stalks and carry them over said platform, and the extended from the conveyor to rake the ground.

2. In a seed harvester adapted to handle mowed seed-bearing stalks, an inclined platform directed downwardly and forwardly at the front of the harvester, an endless conveyer adapted to be moved upwardly over said platform, said conveyer having a portion hanging free under the platform to curve downwardly toward and resting on the ground for a substantial distance and thence upwardly and back over the platform to pick up the seed bearing stalks and carry them over said platform, and a cylinder capable of being revolved above the said platform over said conveyer travelling therebetween, fingers extending from the conveyer, and teeth extending from the cylinder to cooperate with said fingers.

3. In a seed harvester adapted to handle mowed seed-bearing stalks, an inclined platform directed downwardly and forwardly at the front of the harvester, an endless conveyer adapted to be moved upwardly over said platform, said conveyer having a portion hanging free under the platform to curve downwardly toward and to rest on the ground for a substantial distance and thence upwardly and back over the platform to pick up the seed bearing stalks and carry them over said platform, and a cylinder capable of being revolved above the said platform over said conveyer travelling therebetween, teeth projecting from the cylinder, teeth projecting from the conveyer, and guides retaining said conveyer in contact with said platform under said cylinder.

4. In a seed harvester adapted to handle mowed seed-bearing stalks, an inclined platform directed downwardly and forwardly at the front of the harvester, an endless conveyer adapted to be moved upwardly over said platform, said conveyer having a portion hanging free under the platform to curve downwardly toward and to rest on the ground for a substantial distance and thence upwardly and back over the platform to pick up the seed-bearing stalks and carry them over said platform, and means for adjustably positioning the under side of the free portion of the conveyer in reference to the ground to determine the distance behind the platform said conveyor initially contacts the ground.

5. In a seed harvester adapted to handle mowed seed-bearing stalks, an inclined platform directed downwardly and forwardly at the front of the harvester, an endless conveyer adapted to be moved upwardly over said platform, said conveyer having a portion hanging free under the platform to curve downwardly toward and to rest on the ground for a substantial distance and thence upwardly and back over the platform to pick up the seed-bearing stalks and carry them over said platform, said conveyer being formed of transverse members, teeth extending outwardly from the members, said members being adapted to rock whereby said free hanging portion of the conveyer may yieldingly pass over obstructions.

In testimony whereof we affix our signatures.

JOHN HERR.
BENJAMIN GARRETT HERR.

CERTIFICATE OF CORRECTION.

Patent No. 1,727,431. Granted September 10, 1929, to

JOHN HERR ET AL.

It is hereby certified that error appears in the printed specification of the above numbered patent requiring correction as follows: Page 3, line 57, claim 1, for the article "the" read "teeth"; and the said Letters Patent should be read with this correction therein that the same may conform to the record of the case in the Patent Office.

Signed and sealed this 15th day of October, A. D. 1929.

(Seal)

M. J. Moore,
Acting Commissioner of Patents.